United States Patent
Zins et al.

(10) Patent No.: US 6,595,277 B2
(45) Date of Patent: Jul. 22, 2003

(54) WATER WELL FILTER DEVICE AND METHOD OF FILTERING AIR THAT ENTERS INTO A WATER WELL

(75) Inventors: Allan D Zins, Monona, WI (US); John C Rasmussen, Arena, WI (US); Anthony S Earl, Madison, WI (US); Kevin G. Shea, Cross Plains, WI (US)

(73) Assignee: Clean Well Technologies LLC, Madison, WI (US)

( * ) Notice: Subject to any disclaimer, the term of this patent is extended or adjusted under 35 U.S.C. 154(b) by 0 days.

(21) Appl. No.: 10/171,528

(22) Filed: Jun. 12, 2002

(65) Prior Publication Data

US 2003/0010726 A1 Jan. 16, 2003

Related U.S. Application Data

(60) Provisional application No. 60/297,536, filed on Jun. 12, 2001.

(51) Int. Cl.[7] ........................... E21B 33/02; E21B 33/03
(52) U.S. Cl. ....................................... 166/75.13; 55/505
(58) Field of Search ....................... 166/75.13; 210/348, 210/445, 459; 55/505, 385.4

(56) References Cited

U.S. PATENT DOCUMENTS

| | | | |
|---|---|---|---|
| 3,708,965 A | * 1/1973 | Domnick | .................. 55/488 |
| 4,036,616 A | 7/1977 | Byrns | |
| 4,322,230 A | * 3/1982 | Schoen et al. | .............. 96/138 |
| 5,353,949 A | 10/1994 | Seibert et al. | |
| 6,217,639 B1 | * 4/2001 | Jackson | ..................... 96/134 |

OTHER PUBLICATIONS

Drinking Water: Bacteria, Nebraska Cooperative Extension G90–989–A (Revised Nov. 1998). Retrieved Apr. 30, 2001. http://www.lanr.unl.edu/pubs/water/g989.htm.
Earwigs In Your Well. Wisconsin Department of Natural Resources, DNR Publication WS–029. (undated).

Figure 1—Monitor Premium Watertight Cap (OM2O) (Jul. 1, 1997). Well Caps. Baker Mfg. Co., Evansville, WI.
Figure 3 (OM5004) (Nov. 1, 1998). Industrial Pitless Units, Monitor Standard Model Spool Type Pitless Units For 14" & 16" Wells. Baker Mfg. Co., Evansville, WI.
Monitor Division—Cap Cable Seals. Baker Mfg. Co., Evansville, WI. http://www.bakermfg.com/index.php3.
Monitor Division—Premium Watertight Cap w/Screened Air Vent. Baker Mfg. Co., Evansville, WI. http://www.bakermfg.com/index.php3.
Monitor Division—Snorkel Well Cap Vent. Baker Mfg. Co., Evansville, WI. http://www.bakermfg.com/index.php3.
Trest, MT, et al. A Study of the Role of Air–borne Particulates as the Cause of Unexplained Coliform Contamination in Drilled Wells. University of Wisconsin State Laboratory of Hygiene, Water Microbiology Unit, Madison, WI. (undated).
Water Well—Construction—Well Cap and Seal. Retrieved Apr. 30, 2001. http://abe.www.ecn.purdue.edu/~epados/farmstead/well/src/construc4.htm.
Wisconsin Private Well Water Survey (Nitrates, Bacteria, Atrazine, Radon, Sulfates, Arsenic). (Summer 1994). Wisconsin Department of Natural Resources State Laboratory of Hygiene Department of Health and Social Services.

* cited by examiner

*Primary Examiner*—David Bagnell
*Assistant Examiner*—Robert D Jones
(74) *Attorney, Agent, or Firm*—Quarles & Brady LLP

(57) ABSTRACT

A water well filter device and a method for preventing airborne microorganisms from entering into a water well are disclosed. The water well filter device of the present invention contains a microorganism filter element having sufficiently small pore sizes to stop microorganisms from passing through. The water well filter device can further contain a pre-filter, a vacuum relief valve, or both. The method for preventing airborne microorganisms from entering into a water well involves connecting the water well filter device of the present invention to an opening of the well that is otherwise sealed from open air.

20 Claims, 2 Drawing Sheets

WATER WELL FILTER DEVICE AND METHOD OF FILTERING AIR THAT ENTERS INTO A WATER WELL

CROSS-REFERENCE TO RELATED APPLICATION

This application claims the benefit of U.S. provisional patent application serial No. 60/297,536, filed Jun. 12, 2001, which is herein incorporated by reference in its entirety.

STATEMENT REGARDING FEDERALLY SPONSORED RESEARCH OR DEVELOPMENT

Not applicable.

BACKGROUND OF THE INVENTION

The most commonly constructed residential and municipal water well in the United States is the drilled well because drilling is more cost effective than hand digging and drilled wells can be constructed in a variety of geologic formations. Drilled residential and municipal water well casings are usually sealed on the top and side with the exception of one or more openings that are functionally important such as vents to allow air to flow into and out of the well. When water is pumped from a drilled well, water recharge from the aquifer often occurs at a slower rate than the pumping rate, resulting in a draw down of the water level of the well. Vents allow air to rush into the wells as the water level draws down during the pumping process. Without venting, cavitation can occur in the well during the pumping process and water being pumped from the well becomes turbid. Water well vents are often covered by metal screens to stop insects and other objects from entering into the well. However, these screens do not stop microorganisms from entering into the well.

Bacteria contamination of water wells is a wide spread problem in the United States. A nine-state study has shown that over 34% of the drilled wells tested are coliform positive. Many wells contain hazardous *E. coli* bacteria. The water well bacteria contamination problem has been dealt with through frequent bacteria testing and disinfecting wells that are tested positive. A common method to disinfect a water well is to treat the well with chlorine. Chlorine has then to be removed through pumping that lasts several hours.

BRIEF SUMMARY OF THE INVENTION

It is an object of the present invention to provide a water well filter device and a method for preventing airborne microorganisms from entering into a water well. The water well filter device of the present invention contains a microorganism filter element having sufficiently small pore sizes to stop microorganisms from passing through. The water well filter device is designed in such a way that when it is mounted to an opening of a water well that is otherwise air-tightly sealed from the open air, the only way that air can enter into the water well is through the microorganism filter element. The water well filter device can further contain a pre-filter, a vacuum relief valve, or both. The pre-filter helps to stop relatively large particles in the air from reaching and clogging the microorganism filter element and thus prolong the usable life of the microorganism filter element. In case that the microorganisms filter element or the pre-filter is clogged up and a negative pressure is built up inside the well during the water pumping process, the vacuum relief valve can open up to allow air enter into the well and thus prevents any undesirable effects caused by the negative pressure inside the well.

In one embodiment, the water well filter device of the present invention is a microorganism filter that contains a microorganism filter element and a housing. The housing has a connection member that allows the microorganism filter to be mounted onto a well opening in an airtight fashion. The filter element is set in the housing in a manner so that the inside of the housing is divided into two compartments and the only way that air can travel inside the housing from one compartment to other is through the filter element. When the filter device is mounted onto a well opening, one compartment of the housing is in gas communication with the open air and the other with the inside of the well. The term "inside of the well" used in the specification and claims refers to the well space on the well side of the microorganism filter element.

The microorganism filter element described above must be able to stop microorganisms such as bacteria and viruses. Different species of bacteria and viruses are different in size. Depending on the specific species of bacterium that needs to be stopped, the filter element can have pores sizes smaller than 100 microns, 10 microns, 5 microns, 2 microns, 1 micron, 0.45 micron, 0.22 micron, or 0.2 micron. Depending on the specific species of virus that needs to be stopped, the filter element can have pore sizes smaller than 0.25 micron, 0.22 micron, 0.1 micron, 0.05 micron, or 0.02 micron. Microorganisms in the air can exist in clusters of multiple microorganisms or other particles. These clusters are larger in size than single microorganisms and can be stopped by a filter element having pore sizes larger than those mentioned above. Accordingly, a filter element having pore sizes larger than those mentioned above can also be used in the present invention. Any suitable filter medium that has pore sizes sufficiently small to stop bacteria or viruses can be used as the filter element. For example, a conventional paper filter, polypropylene membranes from Osmonics (Kent, Wash.), or Teflon PTFE membranes from Osmonics can be used. The filter housing can be made of durable materials such as metal or hard plastic.

The microorganism filter element is susceptible to being clogged up due to its small pore sizes. To prolong the useable life of the microorganism filter element, another embodiment of the filter device of the present invention further contains a pre-filter with a pre-filter element for filtering out relatively large particles such as dust particles, leave debris and insects from the air before it reaches the microorganism filter element. Depending on the size of the particles that need to be pre-filtered, the pre-filter element can be a metal screen, a screen made of other materials, or a filter element with pore sizes larger than those of the microorganism filter element. In the filter device, the pre-filter is positioned ahead of the microorganism filter element in the airflow pathway from the open air to the inside of the water well so that almost all of the air flowing into the well, if not all, has to pass through the pre-filter element before reaching the microorganism filter element. Preferably, the pre-filter contains a connection member allowing it to be assembled into and disassembled from the filter device easily. As a result, the pre-filter can be replaced without replacing the microorganism filter element.

When either or both of the microorganism filter element and the pre-filer element are clogged up so that air can not enter into the water well, a negative pressure can build up inside the well while water is being pumped out. This may lead to the suction of the water that accumulated around the water well casing above ground water level into the well and further being pumped out. Such water may be contaminated by microorganisms and toxics in the soil and thus pose a risk to human health. To reduce this risk, another embodiment of the filter device of the present invention further contains a vacuum relief valve. The valve has a connection member that allows the valve to be connected to the inside of the well in an airtight fashion. The valve open ups at a preset pressure level allowing outside air to enter into the well. Optionally, the valve contains a whistle for alerting people to check and change either or both of the microorganism filter and the pre-filter. Also optionally, the valve is connected to a valve filter in a fashion so that when the valve opens up, the only way that air can enter into the inside of the well is to go through the valve filter. The valve filter has a filter element that stops certain particles in the air from entering into the well when the valve opens up. The pore sizes of the valve filter element depend the size of the particles that need to be stopped. For example, the valve filter element can be similar to the pre-filter element or the microorganism filter element described above.

The device of the present invention can be used for both residential or municipal wells. The municipal wells are bigger than residential wells and thus the filter device for municipal wells, including the microorganism filter, the pre-filter and the vacuum relief valve is usually larger than that for residential wells.

In still another embodiment, the present invention is a method for preventing airborne microorganisms from entering into a residential or municipal water well. The method involves mounting the water well filter device of the present invention described above to an opening of a water well that is otherwise sealed from the open air. When the filter device mounted does not contain a vacuum relief valve and it is desirable to provide a vacuum relief mechanism, the method of the present invention further involves independently connecting a vacuum relief valve to the inside of the well. Optionally, a valve filter is deployed as well.

Other objects, features and advantages of the present invention will become apparent upon consideration of the following detailed description of specific embodiments taken in conjunction with the accompanying drawings.

DETAILED DESCRIPTION OF THE INVENTION

Figure 1:
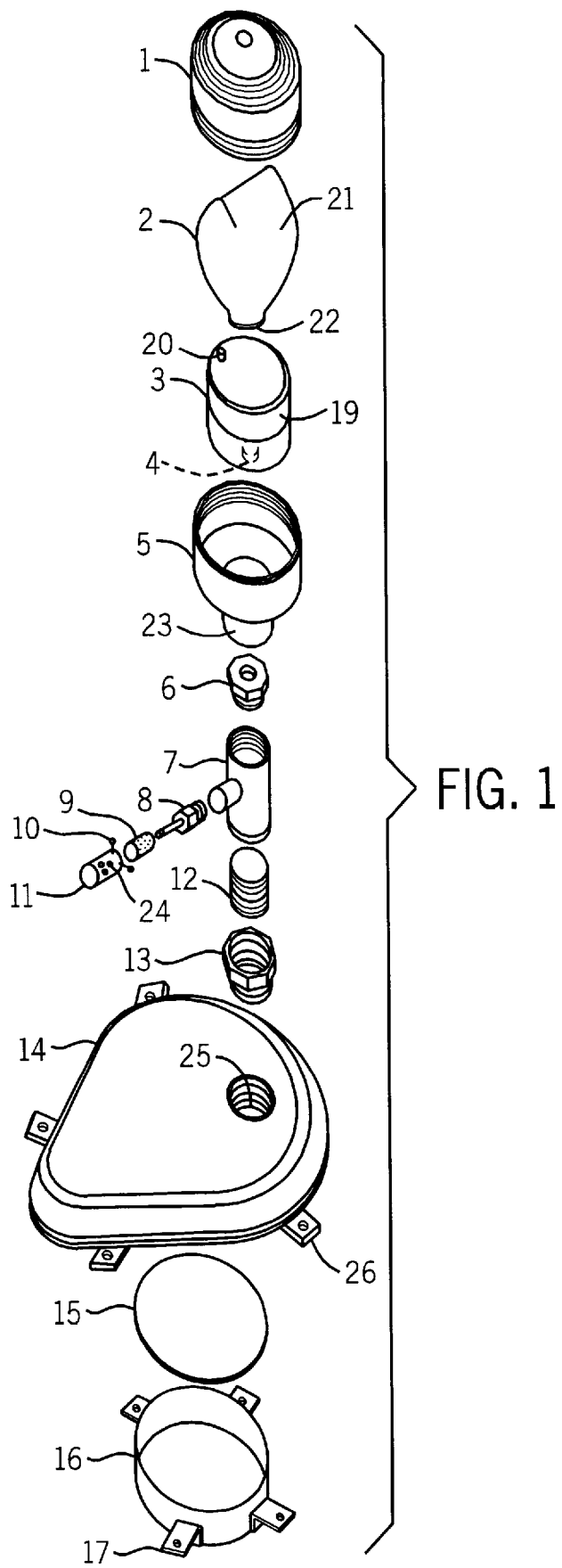
FIG. 1 is an exploded view of an embodiment of the water well filter device of the invention along with well sealing parts used to seal a residential well.

FIG. 1 shows components of a specific embodiment of the water well filter device of the present invention along with well-sealing parts of a residential well to which the filter device connects. In this specific embodiment, the filter device contains a microorganism filter 3, a pre-filter 2, a vacuum relief valve 8, a vacuum relief valve filter 9, and a connection tee pipe 7. The microorganism filter 3 has a housing 19 with a microorganism filter element (not shown) set inside the housing to divide the housing space into two compartments (not shown): one compartment in gas communication with outside the housing through inlet 20 and the other through outlet 4. Air that enters into the housing through inlet 20 and leaves the housing through outlet 4 must pass through the microorganism filter element. One of ordinary skill in the art knows how to construct such a microorganism filter. Outlet 4 is located at the bottom of the housing and has threads on the outside allowing it to be connected to the tee connection pipe 7 in an airtight fashion through bushing 6.

Pre-filter 2 has a pre-filter element 21 and an elastic bottom 22. The elastic bottom 22 holds tightly against the sidewall of the microorganism filter housing 19 so that air that enters into the housing from inlet 20 has to go through the pre-filter element 21 first. The elastic bottom 22 also allows the pre-filter to be easily replaced without having to replace the microorganism filter 3. It is understood that there are many other ways to construct and connect a pre-filter ahead of the microorganism filter. For example, a pre-filter may have a configuration similar to that of the microorganism filter described above and can be screwed onto the inlet 20 of the microorganism filter.

The microorganism filter is protected by an outside housing that has a cap 1 and a bottom 5. The cap 1 can be screwed into or off the bottom 5 so that either or both of the pre-filter 2 and filter 3 can be replaced easily. The bottom 5 of the outside housing has a hollow cylinder protruding 23 that is welded to the connection tee pipe 7. The inner diameter of the hollow cylinder 23 is large enough so that there is gap between the cylinder and both of the tee pipe 7 and bushing 6. Air can enter into the outside housing through the gap.

The vacuum relief valve 8 contains a whistle alarm inside and can be screwed into the connection tee pipe 7 in an airtight fashion. A vacuum relief valve filter depicted as screen 9 in a barrel shape is held into place on the valve by valve cover 11 through screws 10. The valve cover 11 has holes 24 on it to allow air enter into the connection tee pipe 7 through screen 9 and valve 8 when the valve opens up.

Well cap 14, rubber gasket 15 and packing flange 16 are used to seal a residential water well in an airtight fashion except opening 25 on the well cap. The packing flange 16 holds tightly against the outside well casing wall of a well and the well cap is screwed onto the packing flange through the corresponding angel clips 17 and 26. The rubber gasket in between allows airtight seal between the packing flange and the well cap. The connection tee pipe of the water well filter device is connected to the water well cap in an airtight fashion through close nipple 12 and bushing 13.

When necessary, individual components of the water well filter device such as pre-filter 2, microorganism filter 3, vacuum relief valve 8 and valve filter 9 can be replaced individually.

Figure 2:
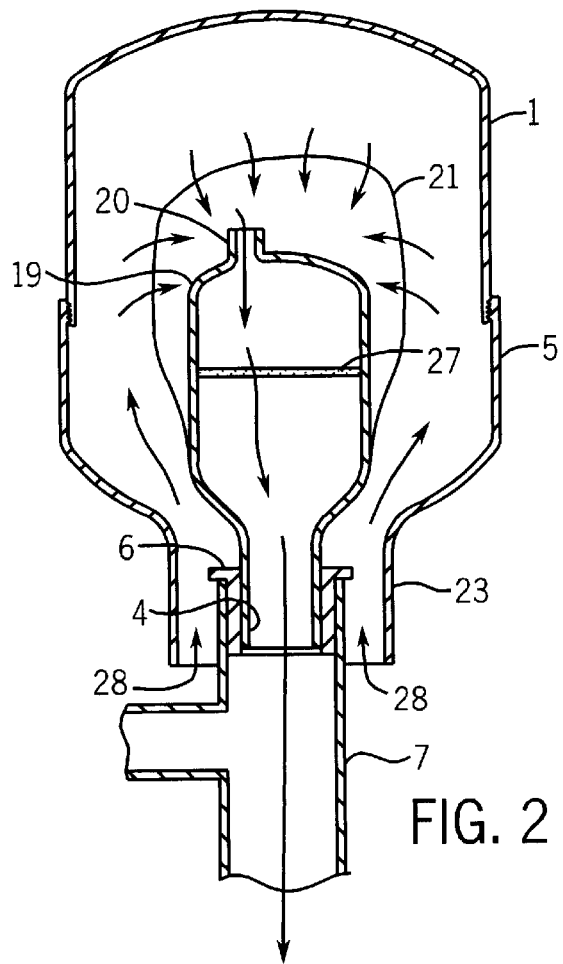
FIG. 2 is a side view of part of the embodiment shown in FIG. 1 to illustrate airflow path from open air into the inside of a well.

FIG. 2 is a side view of part of the well filter device illustrated in FIG. 1 to show the airflow path from open air into the inside of a well through the microorganism filter. Open air 28 goes into the outside housing (cap 1 and bottom 5) through gap between the hollow cylinder 23 of the bottom of the outside housing and both of the connection tee pipe 7 and busing 6. Inside the outside housing, the air flows through pre-filter element 21 and enters into the housing for the microorganism filter element 27 through inlet 20. Inside the housing for the microorganism filter element, air travels through the microorganism filter element 27 and enters into the inside of the well through outlet 4.

The embodiment of the filter device depicted in FIG. 1 has a vacuum relief valve. When an embodiment of the filter device of the present invention that does not contain a relief valve is used for filtering air entering into a water well and a vacuum relief mechanism is desired, a vacuum relief valve can be connected to the inside of the well independently such as through a second opening on the well cap.

Figure 3:
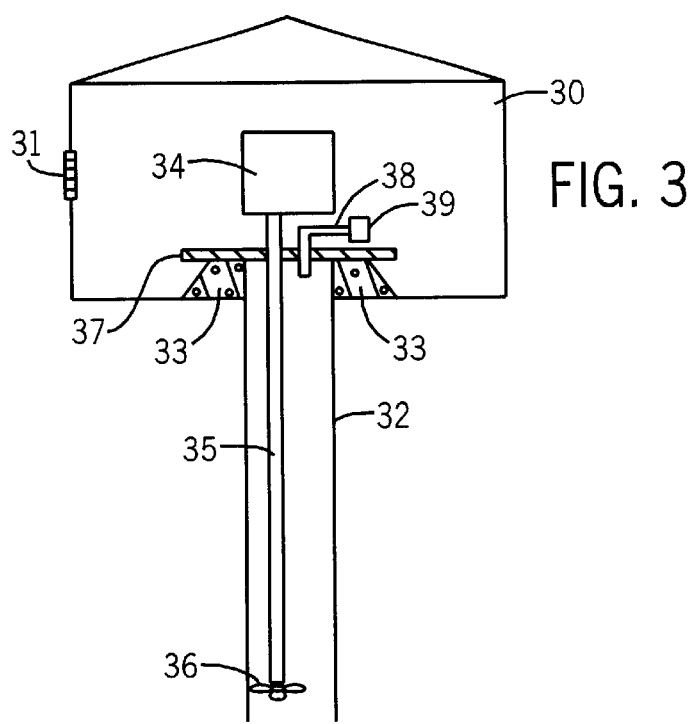
FIG. 3 shows an example of using a water well filter device of the invention to protect a municipal well.

FIG. 3 depicts the situation where the water well filter device of the present invention is used for a municipal well. The municipal well is located in a well house 30 that has screens 31 to stop relatively large particles from entering into the house. However, the screens cannot stop microorganisms. Thus, a filter device of the present invention can be used to stop microorganisms but a pre-filter is not necessary for the filter device in this case. The water well casing 32 at the well opening is surrounded by concrete 33 upon which a motor 34 with a long shaft 35 sits. The well end of the shaft has a propeller 36 attached. To prevent microorganisms from entering into the water well, the well is sealed from the outside air in an airtight fashion except for vent 38 using a metal plate 37. A well filter device 39 of the present invention is connected to the well vent 38 in an airtight fashion. If the filter device 39 used does not contain a vacuum relief valve when a vacuum relief mechanism is desirable, a vacuum relief valve is connected to the inside of the well in an airtight fashion independently. For example, a vacuum relief valve can be connected through the vent 38 or an opening on the metal plate 37.

It is understood that the present invention is not limited to the particular embodiments described above, but embraces all such modifications and variations thereof as come within the scope of the following claims.

We claim:

1. A water well filter device for a residential or municipal well comprising:
    a microorganism filter element wherein the largest pore of the element is of the size of 100 microns or smaller; and
    a housing for the microorganism filter element having a connection member and at least two openings;
    wherein the microorganism filter element is connected to the inside of the housing in a manner so that the inside of the housing is divided by the microorganism filter element into two compartments each of which has at least one opening and the only way air can travel inside the housing from one compartment to the other is through the microorganism filter element, and wherein the connection member allows the filter device to be mounted onto an opening of the water well either directly or indirectly in a manner so that one compartment of the housing is in gas communication with the open air and the other with the inside of the well.

2. The water well filter device of claim 1 further comprising a pre-filter that comprises:
    a pre-filter element having pores the size of which is larger than that of the microorganism filter element pores, wherein the pre-filter is connected to the housing for the microorganism filter element in a manner so that the pre-filter element is positioned ahead of the microorganism filter element in the airflow pathway from open air to the inside of the well.

3. The water well filter device of claim 2, wherein the pre-filter is connected to the microorganism filter element housing in an airtight manner so that air flowing into the well has to pass through the pre-filter element before reaching the microorganism filter element.

4. The water well filter device of claim 2, wherein the pre-filter can be assembled into and disassembled from the housing for the microorganism filter element.

5. The water well filter device of claim 1, wherein the largest pore of the microorganism filter element is of the size of 10 microns or smaller.

6. The water well filter device of claim 1, wherein the largest pore of the microorganism filter element is of the size of 1 microns or smaller.

7. A water well filter device for a residential or municipal well comprising:
    a microorganism filter that comprises:
        a microorganism filter element wherein the largest pore of the element is of the size of 100 microns or smaller;
        a housing for the microorganism filter element at least two openings;
        wherein the microorganism filter element is connected to the inside of the housing in a manner so that the inside of the housing is divided by the microorganism filter element into two compartments each of which has at least one opening and the only way air can travel inside the housing from one compartment to the other is through the microorganism filter element;
    a vacuum relief valve that can open at a preset pressure; and
    a connection pipe to which the microorganism filter, the vacuum relief valve and a water well opening are connected either directly or indirectly wherein the connections are airtight and of a manner so that one compartment of the housing for the microorganism element is in gas communication with the open air and the other with the inside of the well, and wherein the vacuum relief valve is connected to the inside of the well.

8. The water well filter device of claim 7 further comprising a pre-filter that comprises:
    a pre-filter element having pores the size of which is larger than that of the microorganism filter element pores, wherein the pre-filter is connected to the housing for the microorganism filter element in a manner so that the pre-filter element is positioned ahead of the microorganism filter element in the airflow pathway from open air to the inside of the well.

9. The water well filter device of claim 7, wherein the pre-filter is connected to the microorganism filter element housing in an airtight manner so that air flowing into the well has to pass through the pre-filter element before reaching the microorganism filter element.

10. The water well filter device of claim 7, wherein the pre-filter can be assembled into and disassembled from the housing for the microorganism filter element.

11. The water well filter device of claim 7, wherein the largest pore of the microorganism filter element is of the size of 10 microns or smaller.

12. The water well filter device of claim 7, wherein the largest pore of the microorganism filter element is of the size of 1 microns or smaller.

13. A method for preventing an airborne microorganism from entering into a residential or municipal water well, the method comprising the steps of:
    providing a water well filter device of claim 1; and
    mounting the device to an opening of the water well.

14. The method of claim 13 further comprising the steps of:
    providing a vacuum relief valve that can be connected to the inside of the well and open at a preset air pressure inside the well; and
    connecting the vacuum relief valve to the inside of the water well.

15. A method for preventing an airborne microorganism from entering into a residential or municipal water well, the method comprising the steps of:

providing a water well filter device of claim 2; and mounting the device to an opening of the water well.

16. The method of claim 15 further comprising the steps of:

providing a vacuum relief valve that can be connected to the inside of the well and open at a preset air pressure inside the well; and connecting the vacuum relief valve to the inside of the water well.

17. A method for preventing an airborne microorganism from entering into a residential or municipal water well, the method comprising the steps of:

providing a water well filter device of claim 5; and mounting the device to an opening of the water well.

18. The method of claim 17 further comprising the steps of:

providing a vacuum relief valve that can be connected to the inside of the well and open at a preset air pressure inside the well; and connecting the vacuum relief valve to the inside of the water well.

19. A method for preventing an airborne microorganism from entering into a residential or municipal water well, the method comprising the steps of:

providing a water well filter device of claim 7; and connecting the device to an opening of the water well.

20. A method for preventing an airborne microorganism from entering into a residential or municipal water well, the method comprising the steps of:

providing a water well filter device of claim 8; and connecting the device to an opening of the water well.

* * * * *